March 3, 1959   R. F. LO PRESTI ET AL   2,875,886
RIGIDLY SPACED LIMBER IDLER TROUGHING ROLLER
ASSEMBLY FOR ENDLESS CONVEYOR Filed July 21, 1955   2 Sheets-Sheet 1

INVENTOR.
John R. Madeira
Roy F. LoPresti
BY
Murray A. Gleeson
ATTORNEY

March 3, 1959 R. F. LO PRESTI ET AL 2,875,886
RIGIDLY SPACED LIMBER IDLER TROUGHING ROLLER
ASSEMBLY FOR ENDLESS CONVEYOR
Filed July 21, 1955 2 Sheets-Sheet 2

INVENTOR.
John R. Madeira
BY Roy F. LoPresti

*Murray A. Gewson*
ATTORNEY

United States Patent Office 2,875,886
Patented Mar. 3, 1959

2,875,886

RIGIDLY SPACED LIMBER IDLER TROUGHING ROLLER ASSEMBLY FOR ENDLESS CONVEYOR

Roy F. Lo Presti and John R. Madeira, Chicago, Ill., assignors to Goodman Manufacturing Company, Chicago, Ill., a corporation of Illinois Application July 21, 1955, Serial No. 523,438

11 Claims. (Cl. 198—192)

This invention relates generally to endless rope side-frame conveyors and more particularly to an improved troughing idler or roller assembly for the conveying reach of a conveyor of the type which is supported on flexible strand means, the latter means comprising one or a pair of spaced parallel flexible wire ropes or strands.

It is a principal object of this invention to provide an improved conveyor in which elongated flexible strand means (i. e., one or more parallel wire ropes 11, 12) is trained along a course (i. e., a horizontal course) and having a portion which is flexible in one direction (i. e., vertically) which is transverse to the length thereof; and belt carrying means (i. e., the roller assembly 15) supported by the flexible portion of the strand means and comprising, in a unitary structure first elongated troughed anti-friction means (i. e., the rollers 16, 17, 18) disposed substantially transversely of said course and being flexible in said one direction and adapted to have the load-carrying run of a movable belt supported for movement thereacross and second restraining means (i. e., struts 32, 33) effective to limit the movement of the end portions of the anti-friction means toward each other under a load applied to said anti-friction means while enabling unitary movement of the belt-carrying means and flexing of the strand means and anti-friction means in said one direction (i. e., vertically).

Thus, one specific example of this invention is providing a troughing roller assembly which has transversely flexible roller means and a spacer holding the ends of the roller means apart, the assembly being supported on one or more wire ropes whereby an impact load is absorbed by the concurrent flexing both of the wire ropes and of the roller means, and whereby further tilting of the assembly by an offcenter load causes a concurrent corrective non-symmetrical deflection of the roller means to compensate at least in part for the tilting.

An important feature, in the nature of an improvement over prior art troughing roller assemblies for rope side-frame conveyors, is the provision of improved assemblies which can be spaced farther apart along the rope side-frames than has been possible heretofore under a given load, and which roller assemblies automatically increase their troughing angle on the low side to better retain an offcenter load when the assemblies are tilted bodily by such an offcenter load.

Other objects and important features of the invention will be apparent from a study of the specification following taken with the drawing which together describe and illustrate a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the scope and purview of the subjoined claims.

Figure 1:
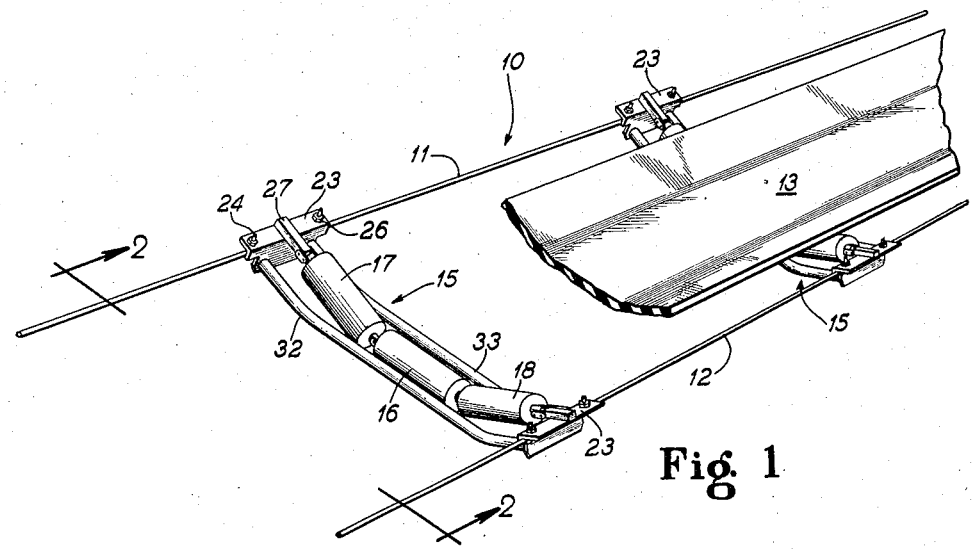
Fig. 1 is a perspective view of the conveying reach of a flexible strand supported belt conveyor, showing the rigid frame limber idler or roller assembly according to the present invention.

Referring now to the drawing, the present invention is embodied in an endless belt conveyor referred to generally by the reference numeral 10. Belt conveyor 10 is of the type which is supported upon a pair of laterally spaced flexible strands 11 and 12, said strands having spaced throughout their length and extending transversely thereof a plurality of improved troughing roller assemblies, each indicated generally by the reference numeral 15.

The belt conveyor 10 has a conveying reach 13 which adopts the contour shown by reason of the troughing roller assemblies 15, each troughing roller assembly 15 additionally transmitting the loads upon the belt 13 into the strands 11 and 12, which are supported, upon for example standards, at intervals along their length to receive the loads upon the conveyor 10. Such standards, not shown herein, are disclosed in United States Letters Patent No. 2,773,257, assigned to the assignee of this invention, and also serve to guide the return reach of the conveyor belt in a manner well known in the art.

Figure 2:
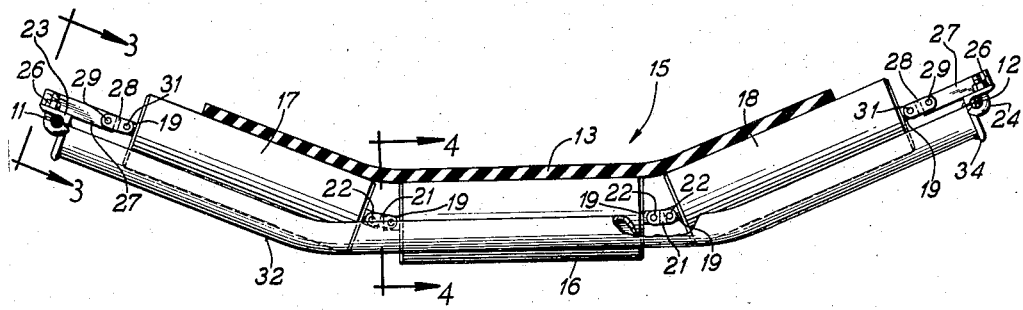
Fig. 2 is an elevation view taken of one of the improved troughing roller assemblies seen in Fig. 1, said view being taken looking in the direction of the arrows 2—2 of Fig. 1.
Figure 3:
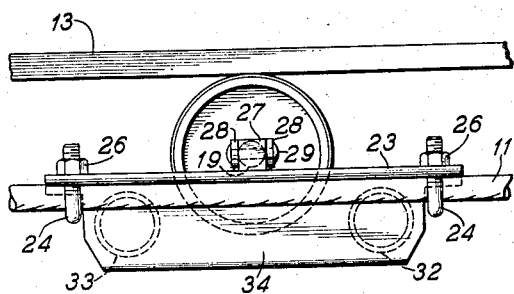
Fig. 3 is an end view of the assembly, said view being taken looking in the direction of the arrows 3—3 of Fig. 2.
Figure 4:
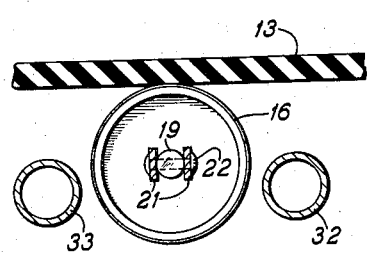
Fig. 4 is a sectional view taken along the lines 4—4 of Fig. 2 looking in the direction of the arrows.

Referring now to Figs. 2, 3 and 4 of the drawings, the troughing rollers are connected together articulately so as to deform or sag suitably upon the passage thereover of a load upon the belt. An extremely large load, except for the construction as will be described, would normally cause the belt to take too large a sag by reason of the articulated connection between the rollers, and would at the same time cause the support strands 11 and 12 to be moved toward each other.

According to the present invention the desirable quality of the roller assembly, in that it is capable of deforming under load, is retained, and at the same time the sag on the belt and the rollers is limited by means of a construction which maintains the support strands a desired distance apart.

Each of the troughing roller assemblies 15 includes a central load supporting roller 16 which is flanked by inclined troughing side or wing rollers 17 and 18. Each of said rollers is of a unitary construction, and is arranged to turn upon a dead shaft 19 which extends beyond the ends of each.

It is desirable in the construction according to the present invention to have the roller assembly flexible in a vertical plane, and accordingly the two troughing side or wing rollers 17 and 18 are connected by a hinge connection to the central load supporting roller 16 in such a fashion that movement is had in the aforesaid plane. To this end the dead shafts 19 which extend beyond the rollers 16, 17 and 18 are connected by means of a link 21 having a pin connection at each end 22 to each of the proximate extending shafts. Thus, roller 16 is connected to side roller 17 in the manner shown and roller 16 is likewise connected to the other side roller 18.

The assembly thus far described is arranged to be supported by the support strands 11 and 12. Each support strand has resting thereon an angle bracket member 23 secured by spaced J-bolts 24 which partly encircle the respective strand, each J-bolt being held to the respective angle member and strand by means of a nut 26 threaded thereto.

A hanger member 27 extends inwardly from each bracket 23 and affords a means of connection for the side roller 17 or 18 which is hingedly connected thereto by means of a link connection 28 and pins 29 and 31 which pass through the hanger member 27 and the end of the shaft 19 extending beyond said side roller 17 or 18.

Each of the brackets 23, which are anchored to the flexible strands 11 and 12 in the manner aforesaid, have extending therebetween lightweight tubular sections 32 and 33 which are welded at their ends to a downstanding leg 34 of each angle member 23. These lightweight tubular members 32 and 33 follow substantially the contour of the conveyor belt 13, but are spaced a distance below same, and to each side of the plane of the supporting roller 16 and troughing wing rollers 17 and 18, so that the rollers may change their relative position in accordance with the loads carried by the conveying reach 13. The two members 32 and 33 act as spacers for the assembly and also prevent inward movement of the flexible strands 11 and 12 under the incidence of an abnormally large load at the assembly 15.

It will be understood that, where reference is made herein to an increase in the troughing or load-supporting angle, that increase is with respect to the belt supporting means, particularly the spacer struts 32, 33, and not necessarily with respect to any horizontal plane in space. For example, it will be apparent that, in Fig. 5, the wing roller 18 has a greater troughing or load-supporting angle relative to the spacer strut 32 than it does in Fig. 2.

The troughing roller assembly 15 which has been described presents a number of advantages over that previously employed, one of the principal ones being that the rollers are so arranged as to be capable of movement with respect to each other under the aforesaid loads. Another advantage resides in the ability to maintain the strands and the ends of the roller assembly a fixed distance apart under such loads. The entire unitary assembly may be readily transported from one point to another in a mine or the like.

Structure as disclosed herein may be particularly advantageous for long spans between points of support of the strands 11 and 12. Such long spans may be made necessary in crossing a ravine, river or the like, or at a crossing above a highway or railroad. In such an installation the freely articulated troughing assemblies will prevent an off center load from tipping over the side, the troughing assembly "troughing deepest" thereat, causing the retaining angle of the belt at that side to increase to tend to hold the load in place.

One of the important features of this invention is the construction whereby limitedly flexible troughing roller assemblies 15 can be spaced far apart along the strand side frames 11, 12 yet they provide automatic compensation for offcenter loads to increase the troughing angle on the low side to help retain such loads on the conveyor. There is a very definite economic advantage in using the greatest possible spacing between troughing roller assemblies because this decreases the cost of the conveyor. For example, limitedly flexible troughing roller assemblies constructed in accordance with the present invention can be spaced as much as 8 feet apart and function in some applications as well as unlimitedly flexible assemblies when spaced at 5 feet intervals; yet the limitedly flexible design automatically adapts the troughing roller assembly to a shape having an increased troughing angle on the low side when subjected to an offcenter load thereby automatically urging the load toward a proper, centered condition.

Figure 5:
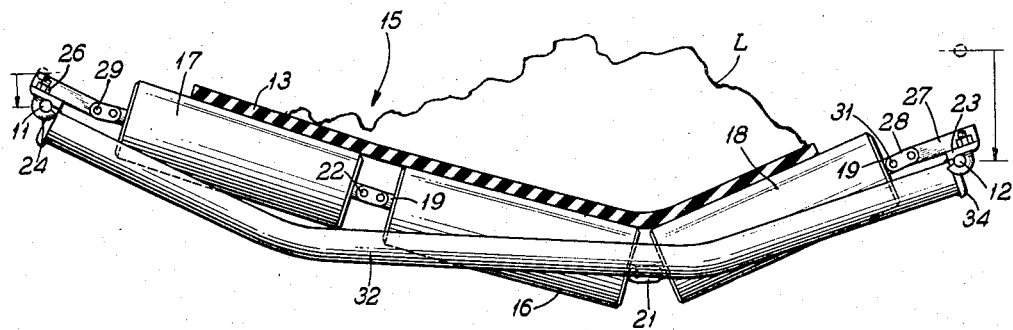
Fig. 5 is a view similar to Fig. 2 but showing the roller assembly bodily tilted under an offcenter load while the troughing angle of the wing roller on the low side is automatically concurrently increased by the same offcenter load to compensate for the tilt.

As shown in Figure 5, there is illustrated the condition where the load L on the belt is offcenter, to the right, thereby displacing the right hand strand sideframe 12 downward to a greater extent than the left hand strand sideframe. Since the roller means is transversely flexible beneath the offcenter load, it troughs more deeply there, automatically increasing the load-retaining angle of that portion of the roller means on the low side, as shown. Since the opposite ends of the roller means are held a fixed distance apart, the flexing of the roller means is limited to provide a predetermined extent of "droop" or sag thereof relative to the strand means 11, 12 regardless of the troughing contour assumed by the roller means under load conditions. The relatively rigid spacer members 32, 33 thus control and limit the flexing of the roller means in a manner which is independent of the spacing between adjacent troughing roller assemblies.

In summary, the present embodiment of the invention comprises a flexible belt conveyor combination in which there is a transversely flexible troughed roller supported at its ends by a relatively rigid spacer frame on transversely flexible strand or wire rope means, the frame being deflectable downwardly as a unit, to absorb impact loads; and, further, when the frame is tilted by an offcenter load, that same offcenter load flexes the roller relative to the frame into a non-symmetrical contour for automatically increasing the load-retaining troughing angle on the low side to compensate for the tilt of the frame.

While the invention has been described in terms of a preferred embodiment its scope is intended to be limited only by the claims here appended.

We claim as our invention:

1. In a belt conveyor: elongated flexible strand means trained along a course and having a portion which is flexible substantially transverse to the length thereof; and belt-carrying means supported by said flexible portion of the strand means, said belt-carrying means comprising elongated troughed roller means and an elongated frame structure including at least one rigid spacer means, said elongated roller means being disposed substantially transverse to the course of said strand means and being flexible transversely of its length and having a surface disposed above the spacer means for supporting a load-carrying run of a movable belt for movement thereacross, said frame structure having the end portions thereof connected respectively to corresponding end portions of said roller means to establish a predetermined troughed contour therefor and being rigid relative to said roller means and effective to restrain movement of said end portions relative to each other for maintaining such predetermined troughed contour for said roller means; whereby a load applied to said flexible roller means in a direction transverse of its length and offcenter thereon may cause: shifting and tilting of said frame structure and roller means as a unit in a direction transverse to the length thereof; differential deflection of said end portions of said roller means in a direction transverse of the length thereof; and a non-symmetrical deflection of said flexible roller means in a direction transverse to the length thereof for modifying the troughed contour thereof to compensate at least in part for said differential deflection.

2. A belt supporting structure for supporting only a conveying reach of a belt conveyor from a pair of spaced flexible support strands, said structure comprising a frame including an elongated rigid spacer strut means, said strut means having adjacent each end portion thereof a strand-engageable bracket for maintaining such support strands at a desired spacing while enabling such support strands to deflect in a direction under load, an elongated roller assembly extending between the end portions of said frame, said roller assembly having the end portions thereof supported in spaced relationship to each other by flexible transversely of its length in said direction for said frame to establish a predetermined troughed contour for said roller assembly, said roller assembly being flexible transversely of its length in said direction for modifying said troughed contour within limits determined by said frame; whereby an offcenter load on said roller assembly may cause: differential deflection of such support strands in said direction; shifting and tilting of said frame and roller assembly as a unit in said one direction; and a non-symmetrical deflection of said roller assembly in said direction to modify said troughing contour of said roller assembly to compensate at least in part for such tilting.

3. In a belt conveyor: a pair of flexible strands trained along generally parallel courses, said strands being flexible substantially independently of one another in a generally vertical direction; belt carrying means for supporting only a load-carrying run of a movable belt; means connecting said belt carrying means respectively to and between said strands at locations where the latter are free to flex; said belt carrying means including elongated roller means disposed transversely to and intermediate of said strands, said roller means having a portion which is flexible and of troughed contour, said belt carrying means also including a frame structure having at least one elongated rigid strut means for restricting the movement of the end portions of said roller means toward one another while enabling up and down movement thereof with said strands, whereby an offcenter load applied to said roller means, resulting in tilting of said belt carrying means by differential downward deflection of said strands, may cause a non-symmetrical deflection of the flexible portion of said roller means to increase the troughing on the low side thereof and compensate at least in part for such tilting of the belt-carrying means.

4. In a belt conveyor, a structure for flexibly supporting a troughable conveying reach of a conveyor belt comprising a pair of coextensive strand means fixed at their ends and trained along a course in horizontally spaced substantially parallel relationship, each strand means of said pair being flexible whereby transversely aligned points thereof at space intervals therealong are each movable downwardly a predetermined distance in all directions substantially normal to the longitudinal axes of the respective strand means, a plurality of elongated troughing roller means, each said roller means, when supported at its ends, being flexible whereby it assumes a substantially catenary contour of a depth variable inversely as the distance between its ends and whereby an intermediate portion of said roller means due to the flexibility of said roller means is movable downwardly out of said catenary contour a distance determined by the combined straight line lengths of the other portions respectively at the opposite ends of said intermediate portion, mounting means supporting each of said roller means at its ends and connecting them with and transversely between said pair of strand means at said transversely aligned points thereof, respectively, to support a said conveying reach for movement on and transversely of said roller means, whereby the ends of each said roller means are movable with the transversely aligned points at which they are connected with said pair of strand means, and spacer means for holding the respective transversely aligned points a fixed distance apart to resist downwardly converging movement thereof and of the ends of the respective roller means and to provide each said roller means with a predetermined substantially catenary contour of predetermined depth whereby the downward movement of said intermediate portion of each said roller means from said predetermined catenary contour is limited to a distance composed substantially of the distance that said intermediate portion moves downwardly out of said predetermined substantially catenary contour due to the flexibility of said roller means, plus the distance of downward movement of said intermediate portion resulting from the combined downward movements of said transversely aligned points of said pair of strand means.

5. In a belt conveyor having a pair of flexible strands trained along generally parallel horizontal courses, said strands being generally vertically flexible, a pair of struts spaced apart along said strands, each strut extending transversely across said strands and having a troughed contour, means connecting the respective end portions of the struts together to define an elongated unitary spacer frame, means connecting each end portion of the spacer frame to a respective one of said strands whereby said spacer frame is effective to maintain a predetermined spacing between the strands at said frame; elongated roller means, a connection between each end portion of said roller means and a respective end portion of said spacer frame for disposing said roller means transversely of said strands between the end portions of said spacer frame with an upper surface of the roller means being disposed at a level above said struts for supporting a load-carrying reach of a movable belt in spaced relation to the struts, said roller means having a troughed portion intermediate the end portions thereof which is flexible in a generally vertical plane, said spacer frame being rigid relative to the roller means and thereby effective to limit flexing of said roller means, whereby vertical loads applied to said roller means may flex said strands and roller means in a downward direction while displacing said spacer frame in the same direction to thereby absorb impact of such loads, and whereby further, an offcenter load on said roller means may cause differential downward deflection of said strands resulting in tilting of said frame and may cause a corrective non-symmetrical deflection of said roller means thereby increasing the troughing angle of the troughed portion of said roller means on the low side to compensate at least in part for the tilting of said spacer frame.

6. A belt supporting structure for transmitting a load on a conveying reach of a belt conveyor into a pair of spaced generally parallel and horizontal strands, said structure comprising a pair of generally parallel struts connected together adjacent their respective end portions to define an elongated unitary spacer frame, each end portion of the spacer frame having a strand-engageable connector adapted to be coupled to a respective one of such strands whereby said spacer frame may be effective when coupled thereacross to maintain a predetermined spacing therebetween at said frame while enabling up and down movement of the end portions of said spacer frame therewith, elongated vertically flexible roller means disposed generally between the end portions of the spacer frame and generally parallel to the struts, a connection between each end portion of said roller means and a respective end portion of said spacer frame, each of said connections being at a level above the intermediate portions of said struts enabling said flexible roller means to have a troughed portion intermediate the end portions thereof, said troughed portion having an upper surface disposed at a level above said struts for flexibly supporting a troughed conveying reach of a movable belt for movement thereacross, said spacer frame being relatively more rigid than the roller means and thereby effective to limit flexing of said roller means, whereby vertical loads applied to said roller means when the spacer frame is supported on flexible strands may flex said roller means and displace said spacer frame in a vertical direction to thereby absorb impact of such loads, and whereby further, differential deflection of the ends of said spacer frame by an offcenter load resulting in tilting of said spacer frame causes a corrective non-symmetrical deflection of said troughed portion of the roller means thereby decreasing the included load-retaining angle thereof.

7. A belt supporting structure including an elongated rigid troughing roller frame means, an elongated flexible roller assembly, connections between respective end portions of said roller assembly and frame means, said connections being disposed above the level of the mid-portions of said frame means to establish a predetermined troughed contour for said roller assembly in which an upper belt-engaging surface of said roller assembly is disposed at a level above said frame means, and connector means carried by each end portion of said frame means for connecting the frame means to a pair of flexible strands to maintain such strands at a desired spacing while enabling the frame means to move up and down therewith, whereby an offcenter load on said structure when strand-supported is effective to tilt said frame means and to flex the roller assembly non-symmetrically to at least partially compensate for the tilt.

8. A controlled flexible troughing assembly comprising elongated troughing roller means, said roller means, when supported by the end portions thereof, being flexible so as to assume a substantially concave contour of a depth which is variable inversely as the spacing between said end portions and being deformable so that an intermediate portion of said roller means is movable downwardly out of said contour a distance determined by the combined straight line lengths of the other portions of said roller means respectively flanking said intermediate portion, an elongated rigid frame having means at each end portion for mounting the frame to a downwardly movable flexible sideframe for movement therewith, connecting means for connecting the respective end portions of said frame to corresponding end portions of said roller means to resist converging movement of said end portions of said roller means and to provide said roller means with a predetermined substantially concave contour of predetermined depth, whereby downward movement of said intermediate portion of said roller means is limited to a distance composed substantially of the distance that said intermediate portion moves downwardly out of said predetermined contour plus the distance of downward movement of said intermediate portion resulting from the combined downward movements of the end portions of said frame.

9. The belt supporting structure according to claim 7 wherein the said frame means is generally rectangular in shape with a pair of rigid substantially parallel spacer members defining opposed sides of said rectangle and said roller assembly is disposed generally between the end portions of said frame means.

10. The belt supporting structure according to claim 6 wherein said roller means includes a series of roller shafts each having a roller rotatably journaled thereon, said shafts being flexibly interconnected about horizontal pivot means for movement in a vertical direction relative to one another with the end shafts of said series being flexibly connected respectively to the connections.

11. In a belt conveyor, a supporting structure for the conveying reach of a conveyor belt, comprising a pair of flexible strands trained along opposite longitudinal margins of a substantially horizontal conveyor course and supported and maintained a fixed distance apart at locations spaced along said course to provide a pair of elongated flexible strand portions which extend in parallel relationship between two of said locations, elongated flexible troughing roller means, connectors connecting the opposite ends of said roller means to said flexible strand portions, respectively, between and spaced from said two locations, whereby said roller means is supported transversely of and between said flexible strand portions at positions where they are flexible and cooperates with said strands flexibly to support and trough the conveying reach of a conveyor belt mounted for conveying movement across said roller means along said course, and spacer means engaging each of said connectors at the opposite ends of said roller means and holding said opposite ends a fixed distance apart during movement thereof resulting from flexing of said flexible strand portions, whereby to eliminate variations in the troughing depth of said roller means resulting from variations in the distance between the opposite ends thereof due to its flexibility and the flexibility of said strand means, for limiting the extent of downward movement of an intermediate portion of said flexible roller means to the downward movement of said intermediate portion resulting from downward flexing of said flexible strand portions and to the downward movement of said intermediate portion resulting from the straightening effect of a load applied to said intermediate portion on the portions of said flexible roller means at the opposite ends of said intermediate portion.

References Cited in the file of this patent

UNITED STATES PATENTS

| 1,295,138 | Dull | Feb. 25, 1919 |
| 1,748,301 | McKinlay | Feb. 25, 1930 |
| 2,592,831 | Spurgton et al. | Apr. 15, 1952 |
| 2,798,591 | Stamos | July 9, 1957 |

FOREIGN PATENTS

| 53,825 | Germany | Feb. 9, 1890 |
| 890,337 | France | Nov. 2, 1943 |

UNITED STATES PATENT OFFICE
CERTIFICATE OF CORRECTION

Patent No. 2,875,886                                March 3, 1959

Roy F. Lo Presti et al.

It is hereby certified that error appears in the printed specification of the above numbered patent requiring correction and that the said Letters Patent should read as corrected below.

Column 5, line 2, strike out "flexible transversely of its length in said direction  for".

Signed and sealed this 18th day of August 1959.

(SEAL)
Attest:

KARL H. AXLINE
Attesting Officer

ROBERT C. WATSON
Commissioner of Patents